Figure 1:
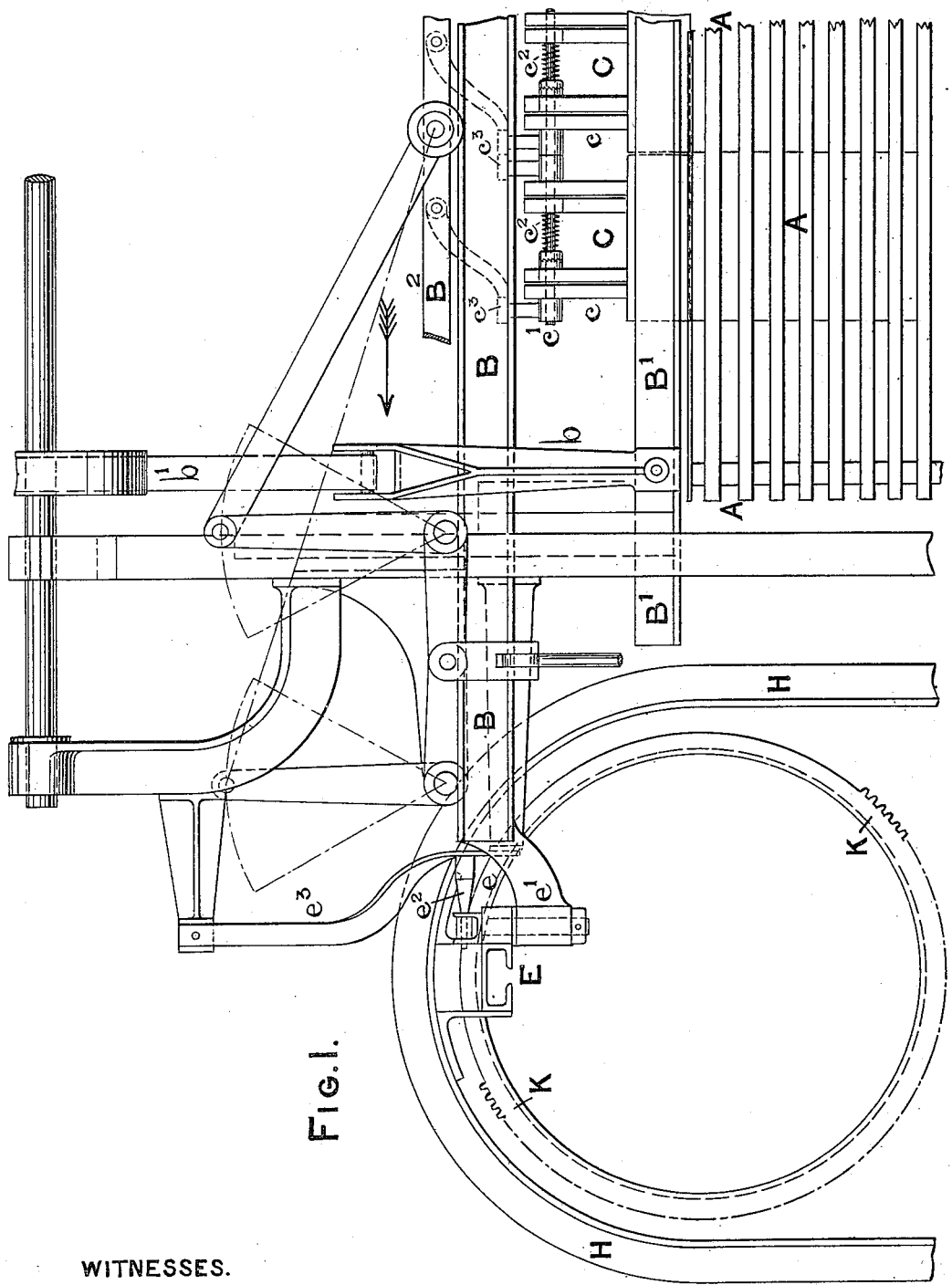

No. 662,117. Patented Nov. 20, 1900.
J. V. EVES.
HACKLING MACHINE.
(Application filed July 19, 1900.)
(No Model.) 17 Sheets—Sheet 1.

WITNESSES.
Joseph Bates.
C. W. Alexander.

INVENTOR.
J. V. Eves

No. 662,117. Patented Nov. 20, 1900.
J. V. EVES.
HACKLING MACHINE.
(Application filed July 19, 1900.)
(No Model.) 17 Sheets—Sheet 2.

WITNESSES.
Joseph Bates.
C. W. Alexander.

INVENTOR.
J. V. Eves

No. 662,117. Patented Nov. 20, 1900.
J. V. EVES.
HACKLING MACHINE.
(Application filed July 19, 1900.)
(No Model.) 17 Sheets—Sheet 7.
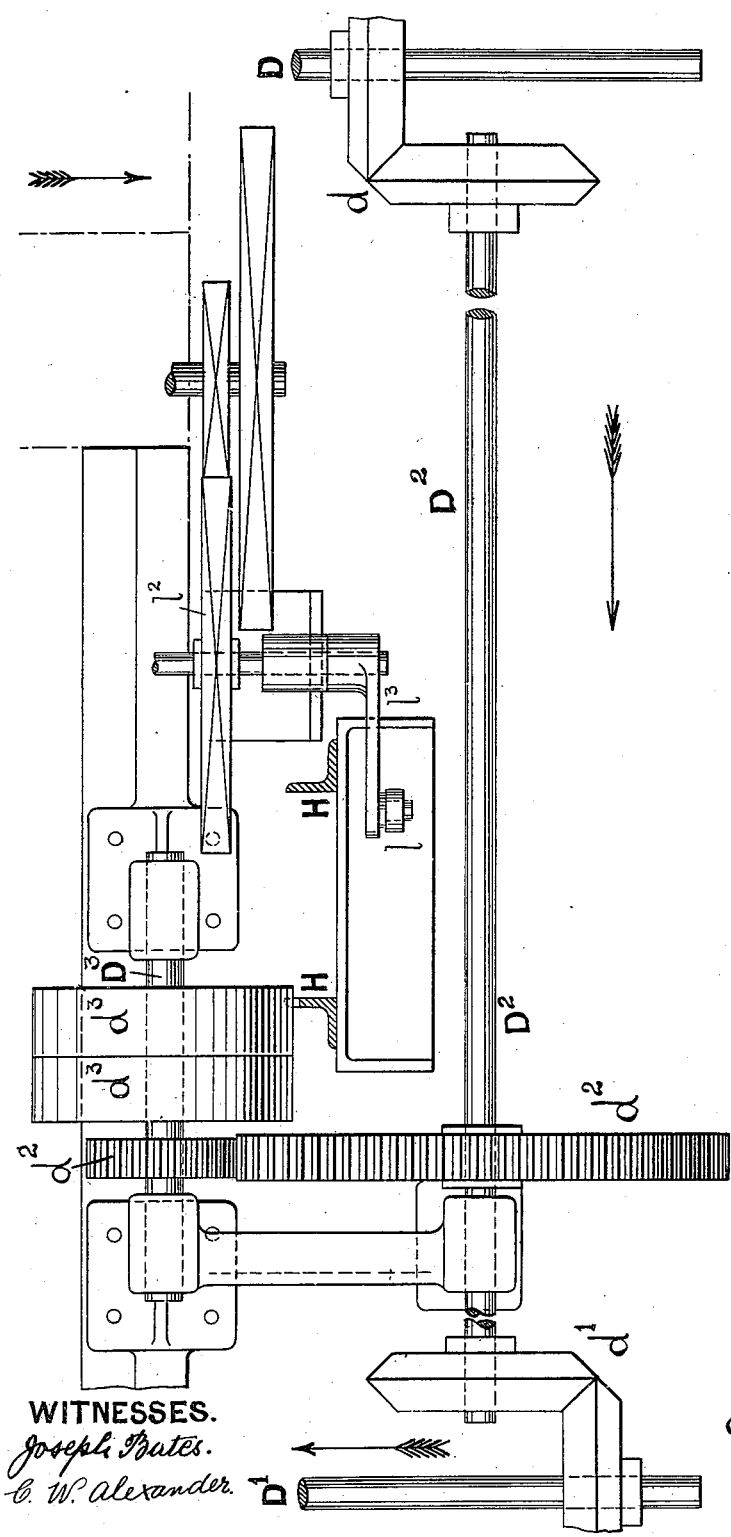
FIG. 7.
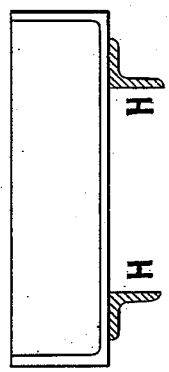
WITNESSES.
Joseph Bates.
C. W. Alexander.
INVENTOR.
J. V. Eves
by J. Owen O'Brien
atty No. 662,117. Patented Nov. 20, 1900.
J. V. EVES.
HACKLING MACHINE.
(Application filed July 19, 1900.)

(No Model.) 17 Sheets—Sheet 10.

WITNESSES
Joseph Bates.
C. W. Alexander.

INVENTOR
J. V. Eves

No. 662,117.　　　　　　　　　　　　　　　　Patented Nov. 20, 1900.
J. V. EVES.
HACKLING MACHINE.
(Application filed July 19, 1900.)

(No Model.)　　　　　　　　　　　　　　　　17 Sheets—Sheet 11.

FIG. II.

WITNESSES.　　　　　　　　　　　　　　　INVENTOR.
Joseph Bates.
C. W. Alexander.

No. 662,117. Patented Nov. 20, 1900.
J. V. EVES.
HACKLING MACHINE.
(Application filed July 19, 1900.)
(No Model.) 17 Sheets—Sheet 12.

WITNESSES.
Joseph Bates.
C. W. Alexander.

INVENTOR.
J. V. Eves
by Dowden O'Brien
atty

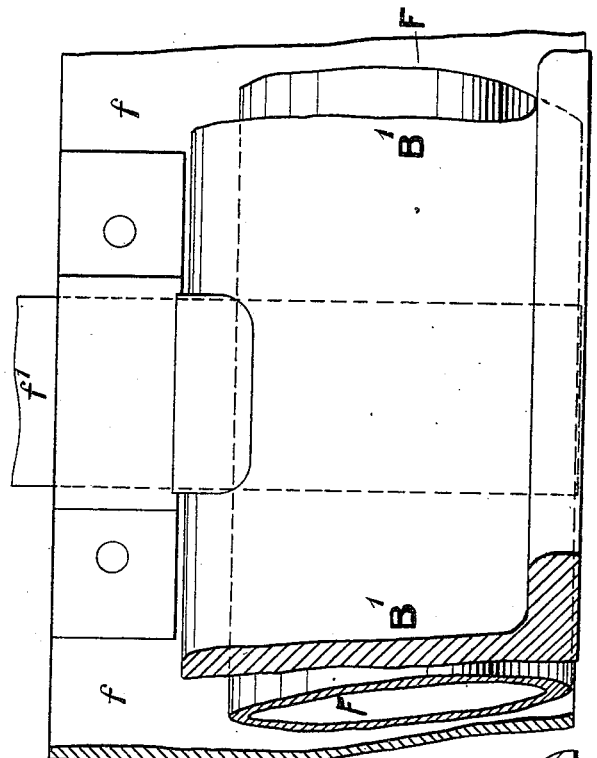
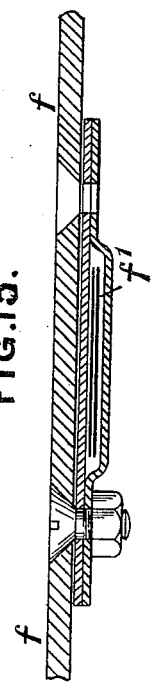
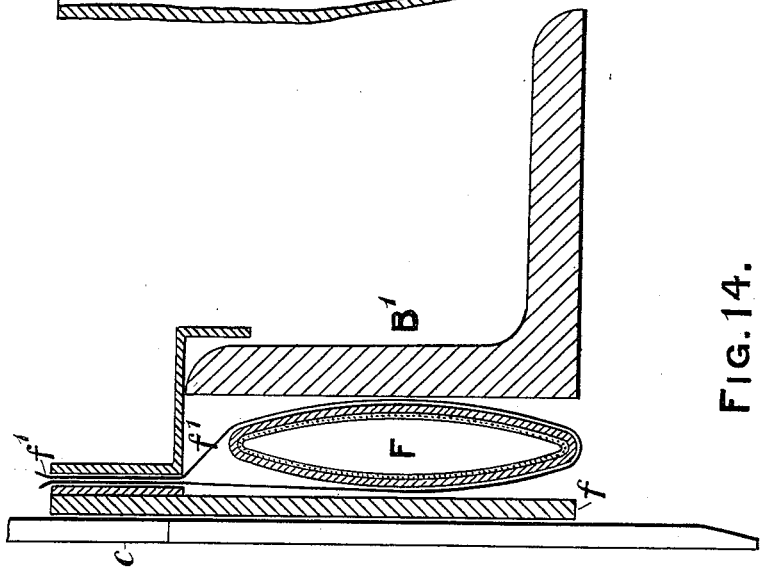
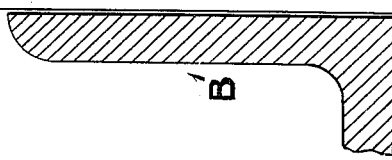

No. 662,117. Patented Nov. 20, 1900.
J. V. EVES.
HACKLING MACHINE.
(Application filed July 19, 1900.)
(No Model.) 17 Sheets—Sheet 15.
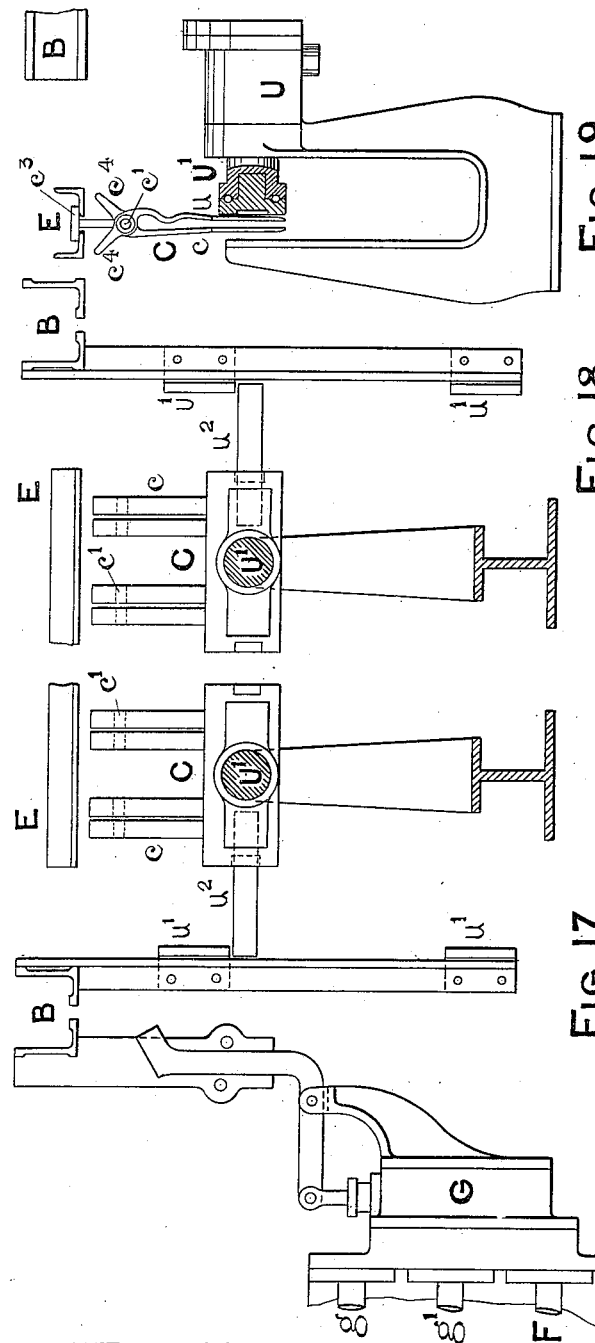
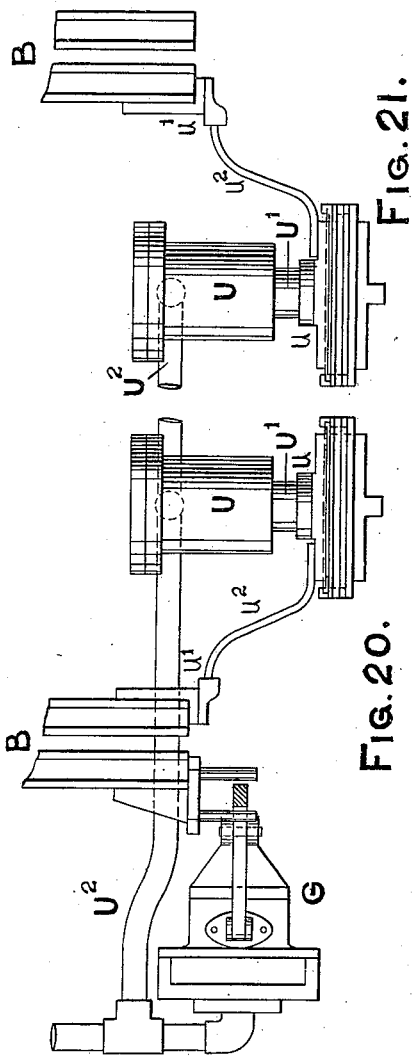

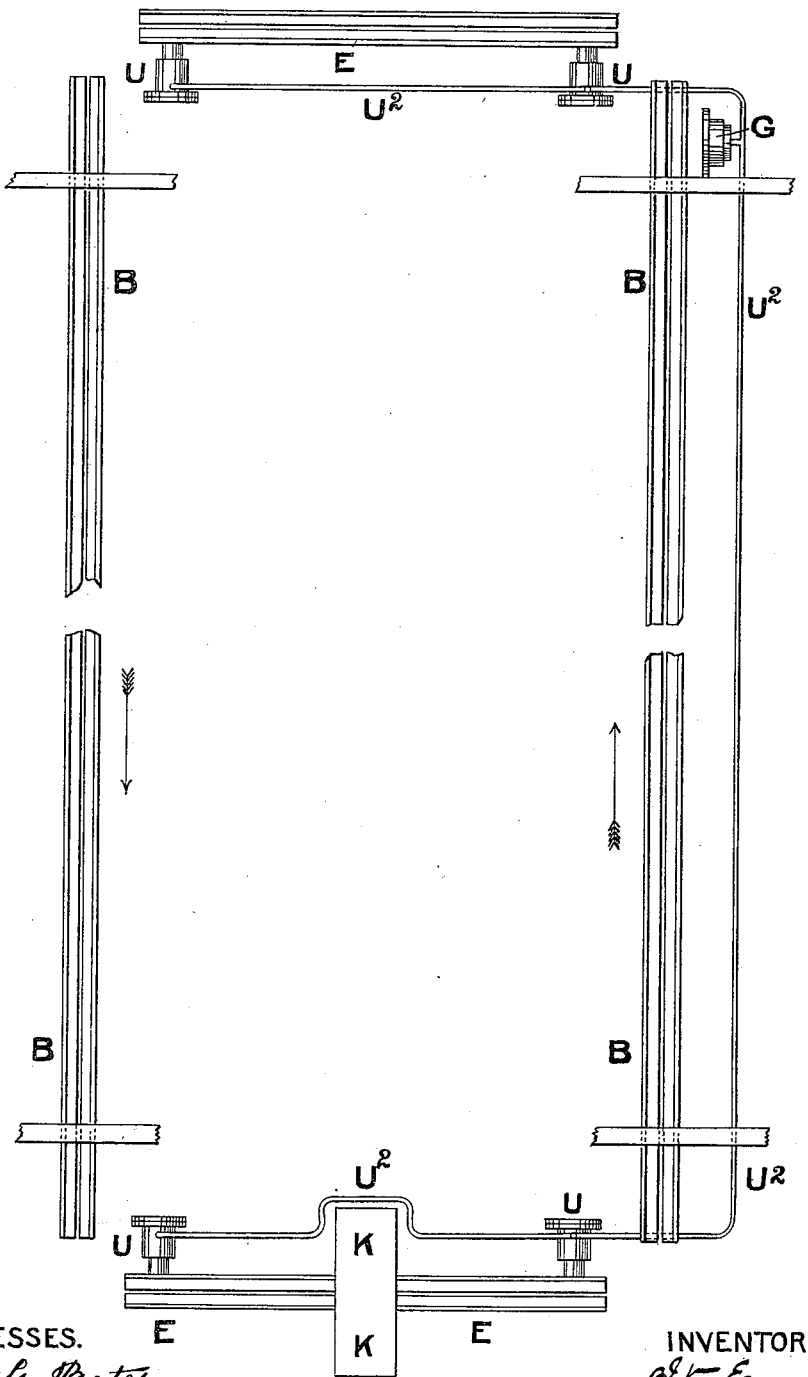

UNITED STATES PATENT OFFICE.

JOSHUA VALENTINE EVES, OF BELFAST, IRELAND.

HACKLING-MACHINE.

SPECIFICATION forming part of Letters Patent No. 662,117, dated November 20, 1900.

Application filed July 19, 1900. Serial No. 24,148. (No model.)

*To all whom it may concern:*

Be it known that I, JOSHUA VALENTINE EVES, a subject of the Queen of Great Britain, and a resident of Belfast, in the county of Antrim, Ireland, have invented certain new and useful Improvements in Hackling-Machines for Flax or Similar Fibers, of which the following is a specification.

This invention relates to machines for hackling long-staple fibers, such as flax, and is designed to economize labor in the manual attendance required to pass the fiber through the machines and also to render more efficient the mechanical devices already applied to that purpose.

The invention consists, essentially, in constructing the machines with a connecting-channel at one end, by which the flax-holders are automatically conveyed from one head to the next by a swiveling piece, a turn-table or reversing mechanism by which the flax is reversed or changed in the holders when part has been operated upon, a channel at the other end to receive and open the holders when the flax has been operated upon for the removal of such flax and the insertion of a fresh piece, a channel to carry the holder when refilled to the first head, a holder which can be compressed and released as it travels intermittently along the channel, and a pneumatic or hydraulic gripping device extending the length of the channel or placed at the ends thereof, which alternately compresses and releases the holder to allow it to pass along the machine as the fiber is acted upon successively by each set of hackle-pins.

The invention will be fully described with reference to the accompanying drawings, in which sufficient of a hackling-machine is shown for the purpose.

Figure 2:
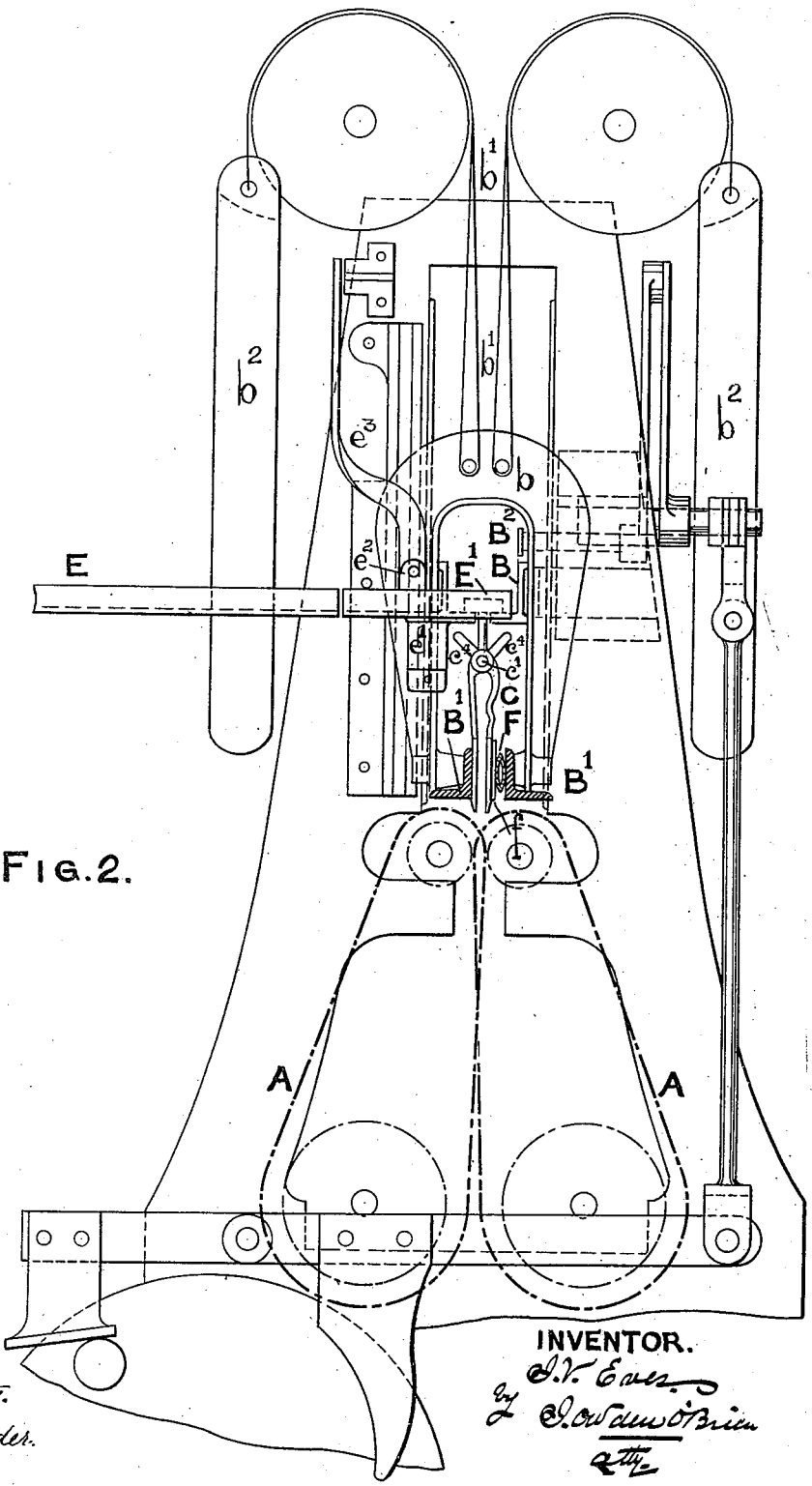
Figure 3:
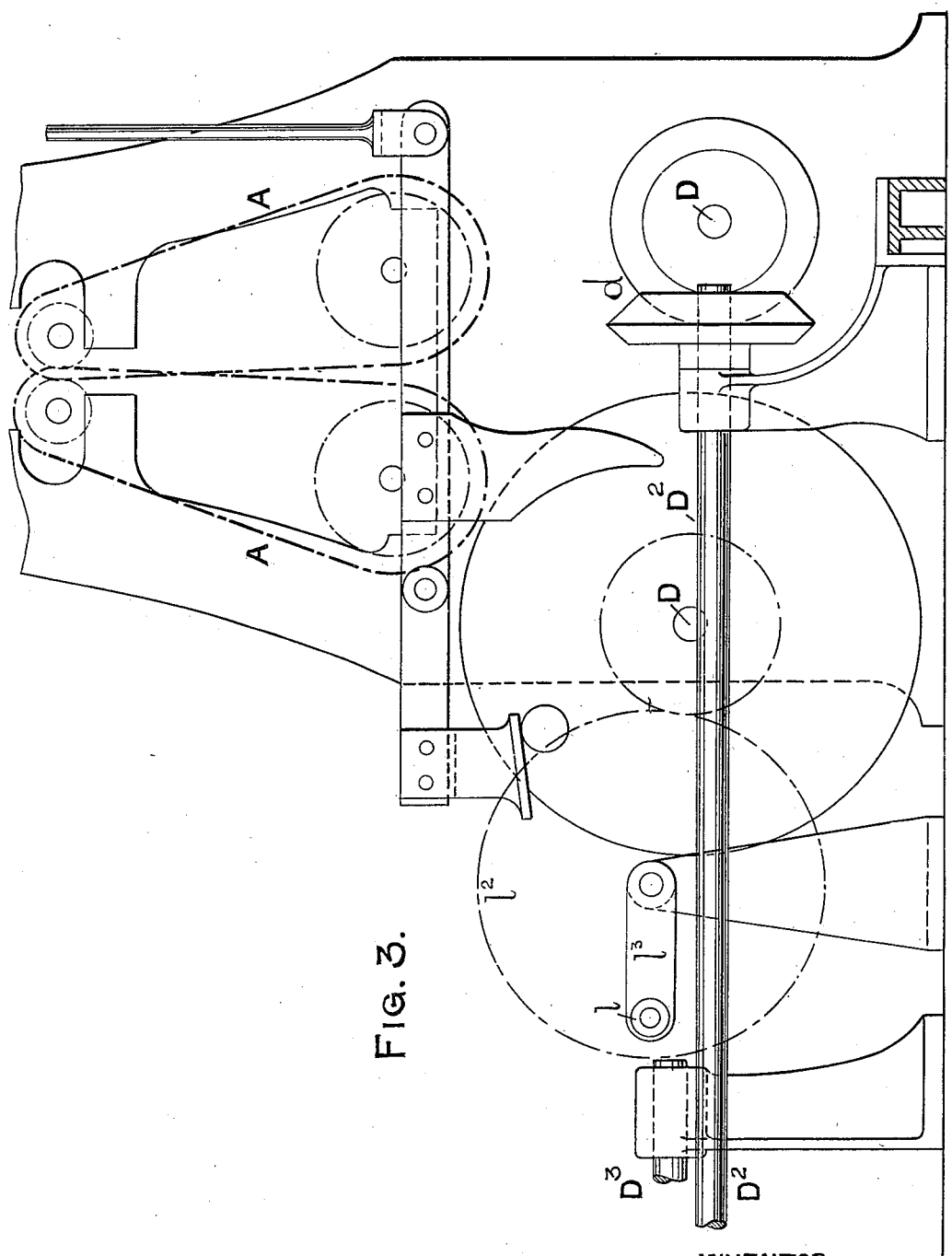
Figure 4:
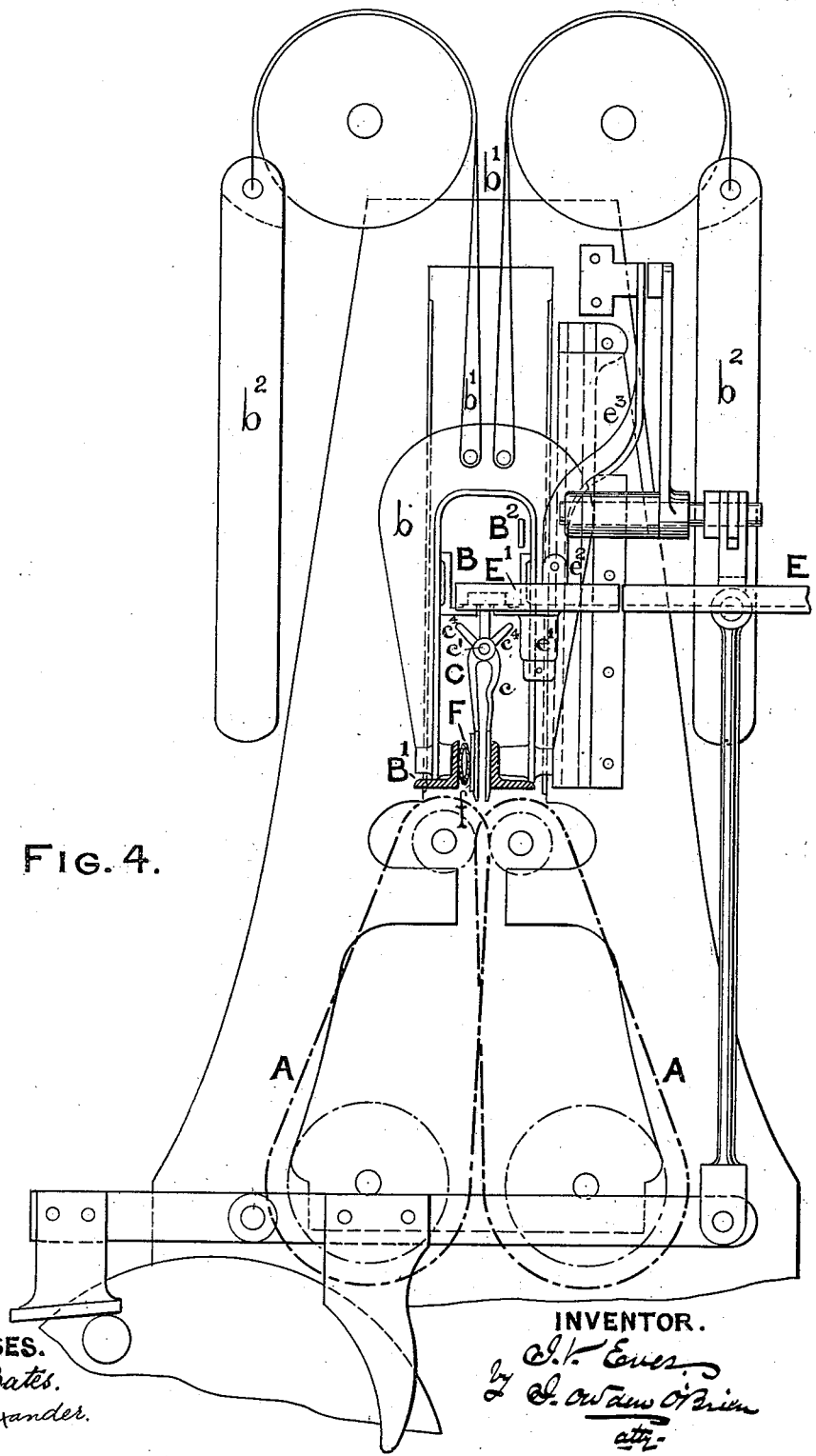
Figure 5:
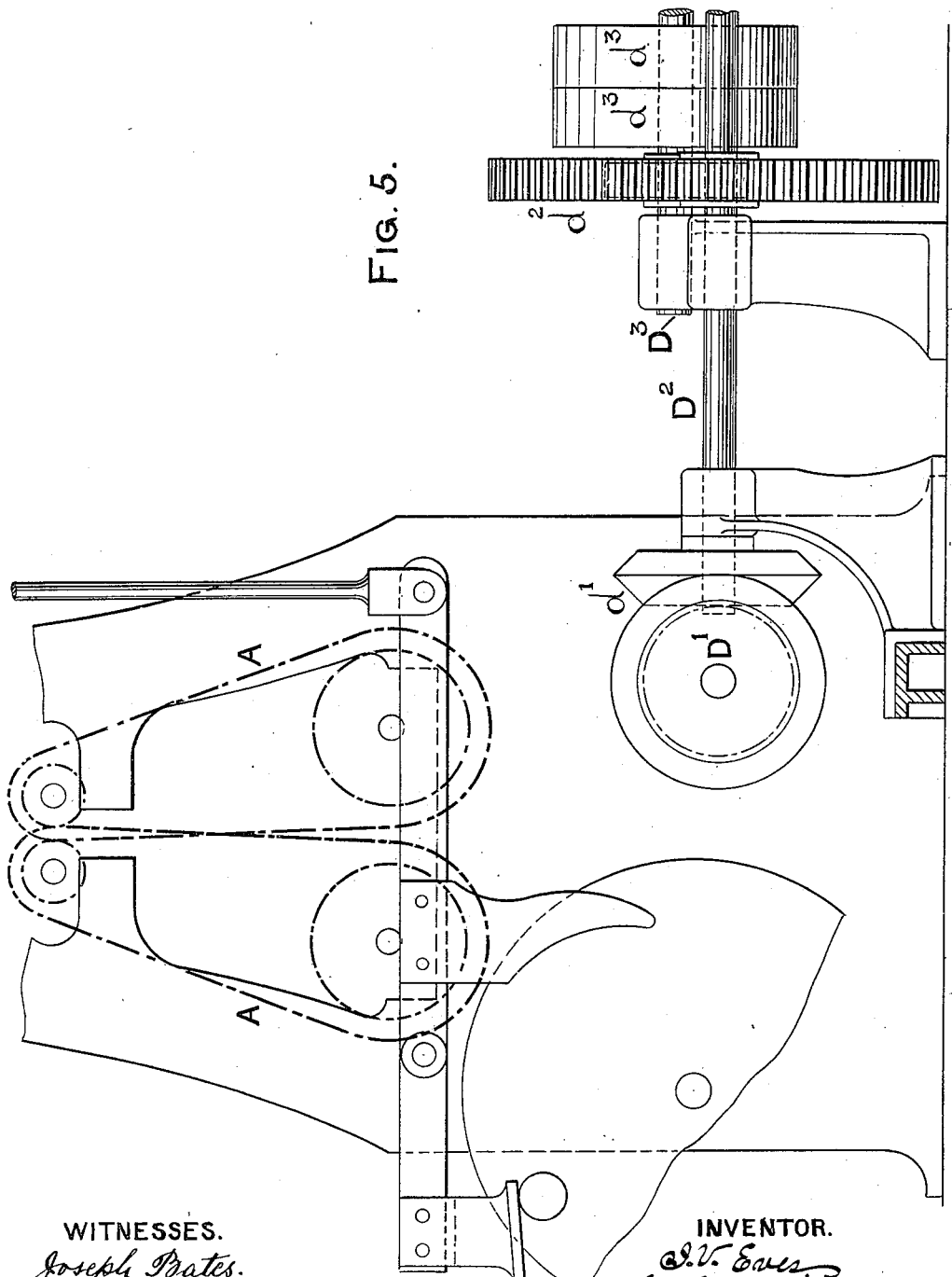
Figure 6:
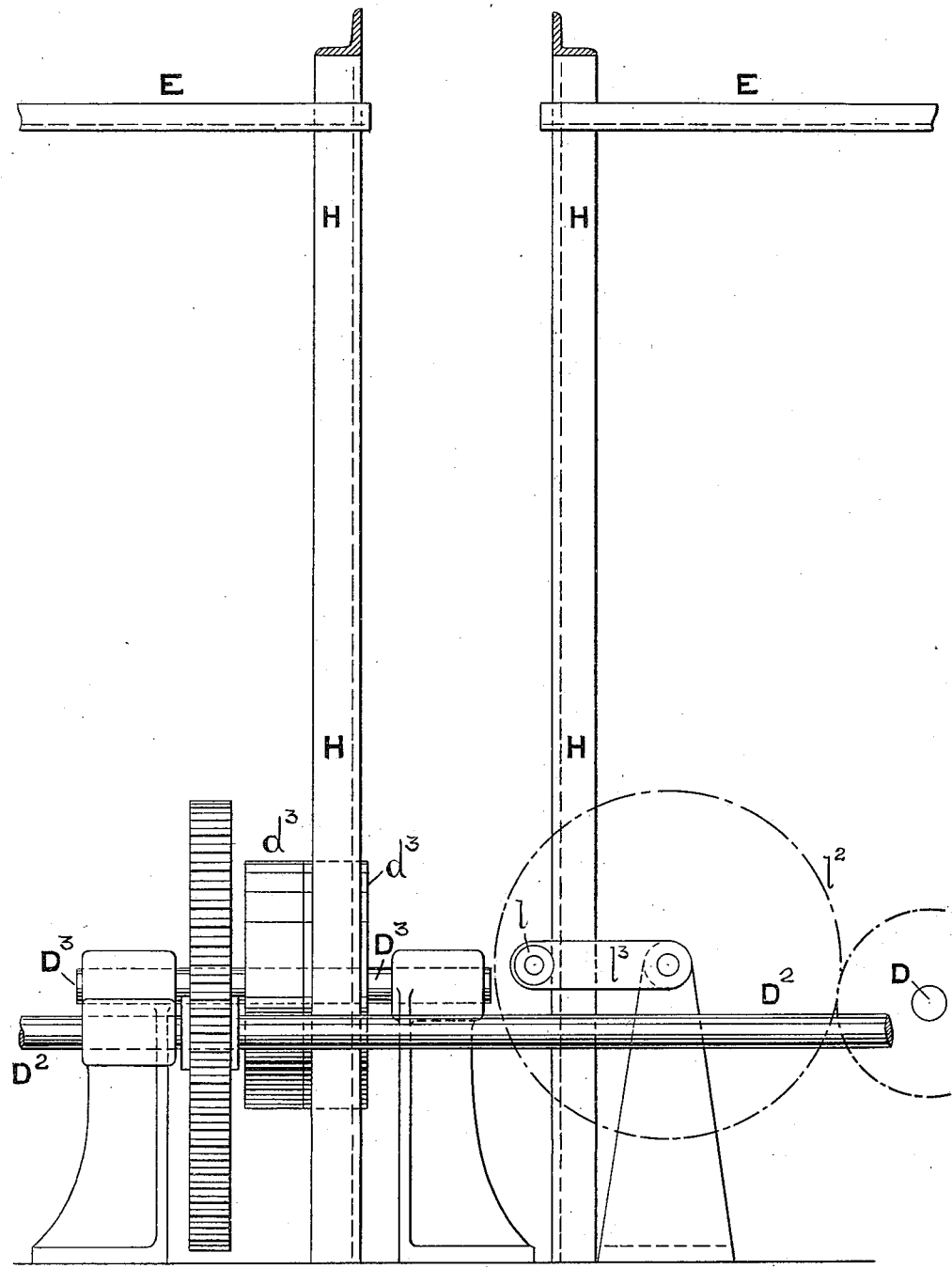
Figure 8:
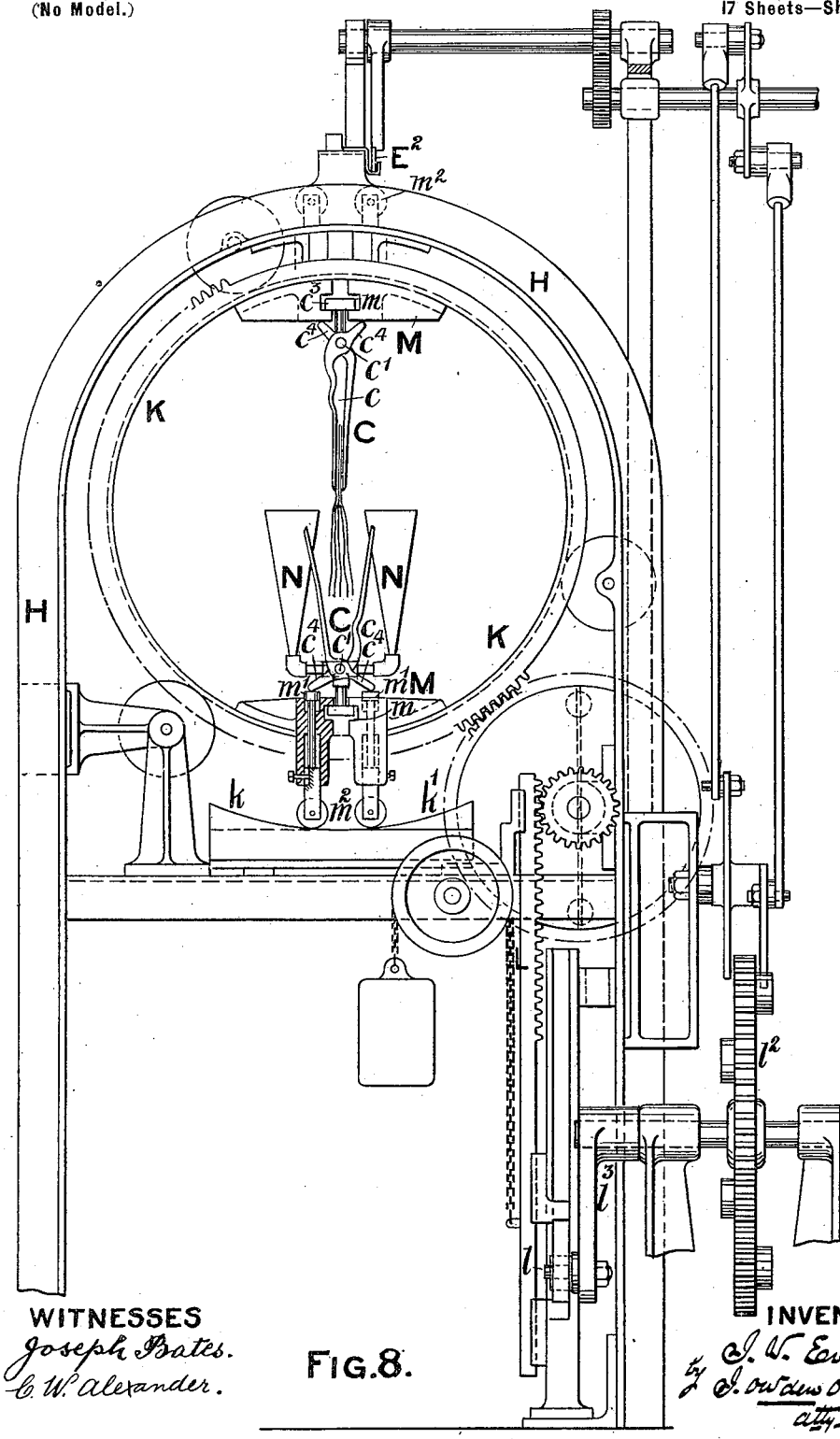
Figure 9:
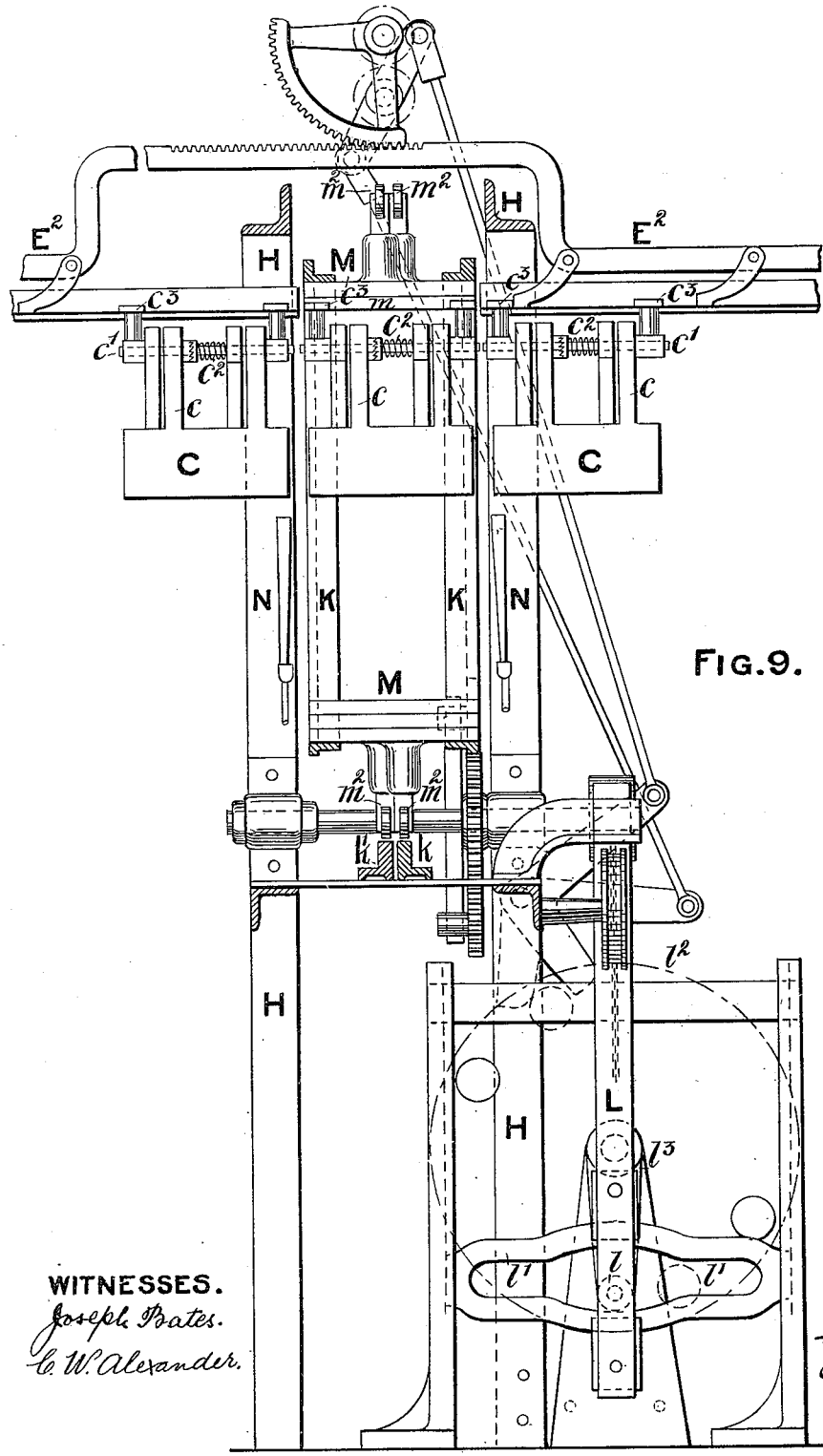
Figure 10:
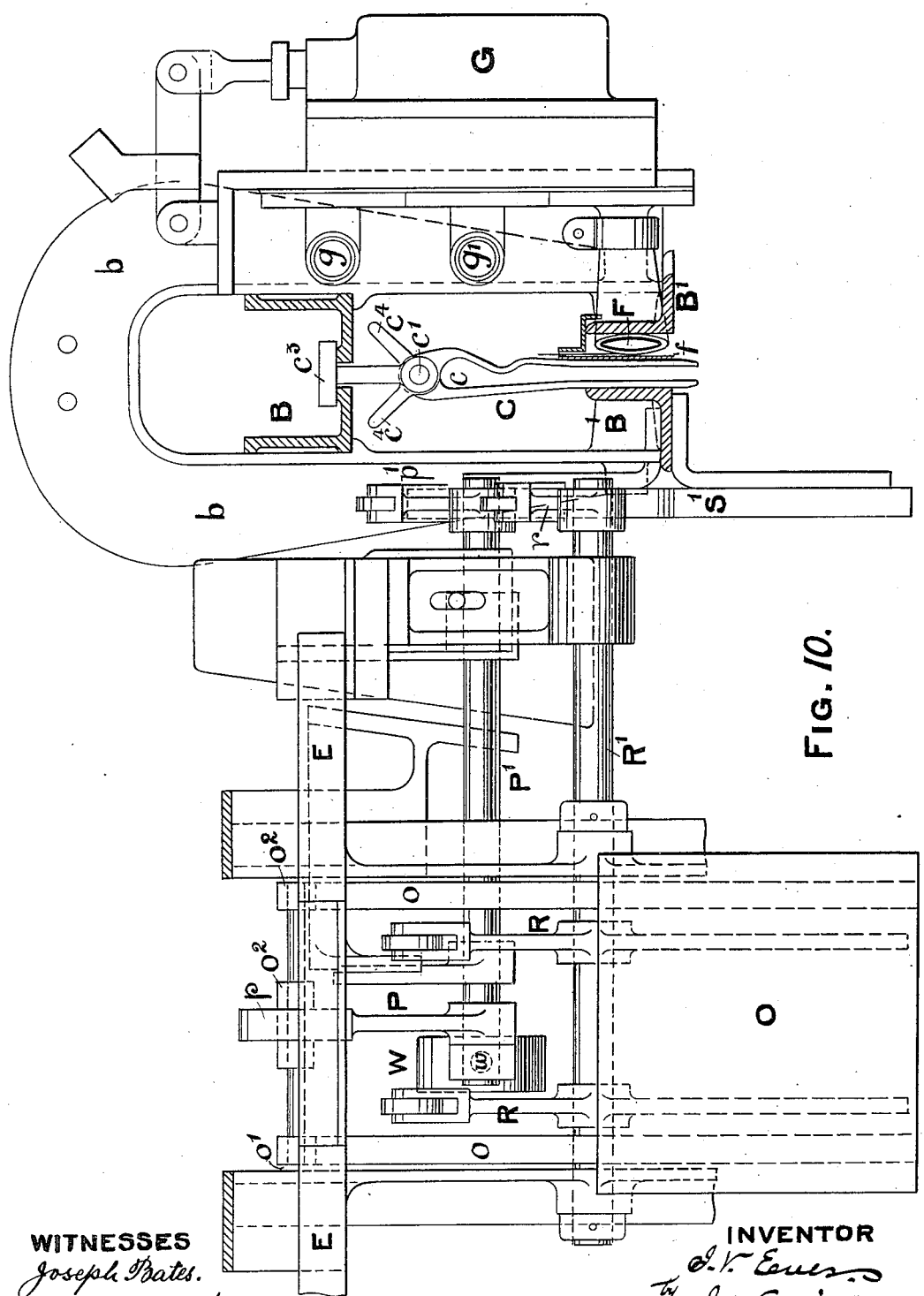
Figure 11:
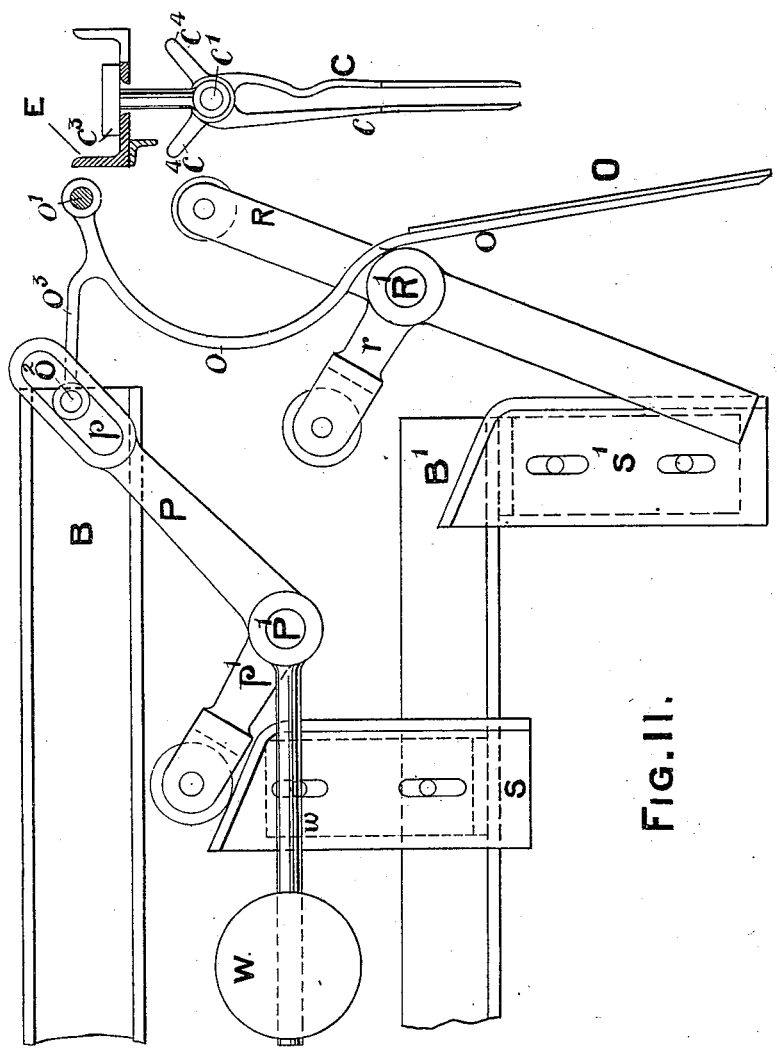
Figure 12:
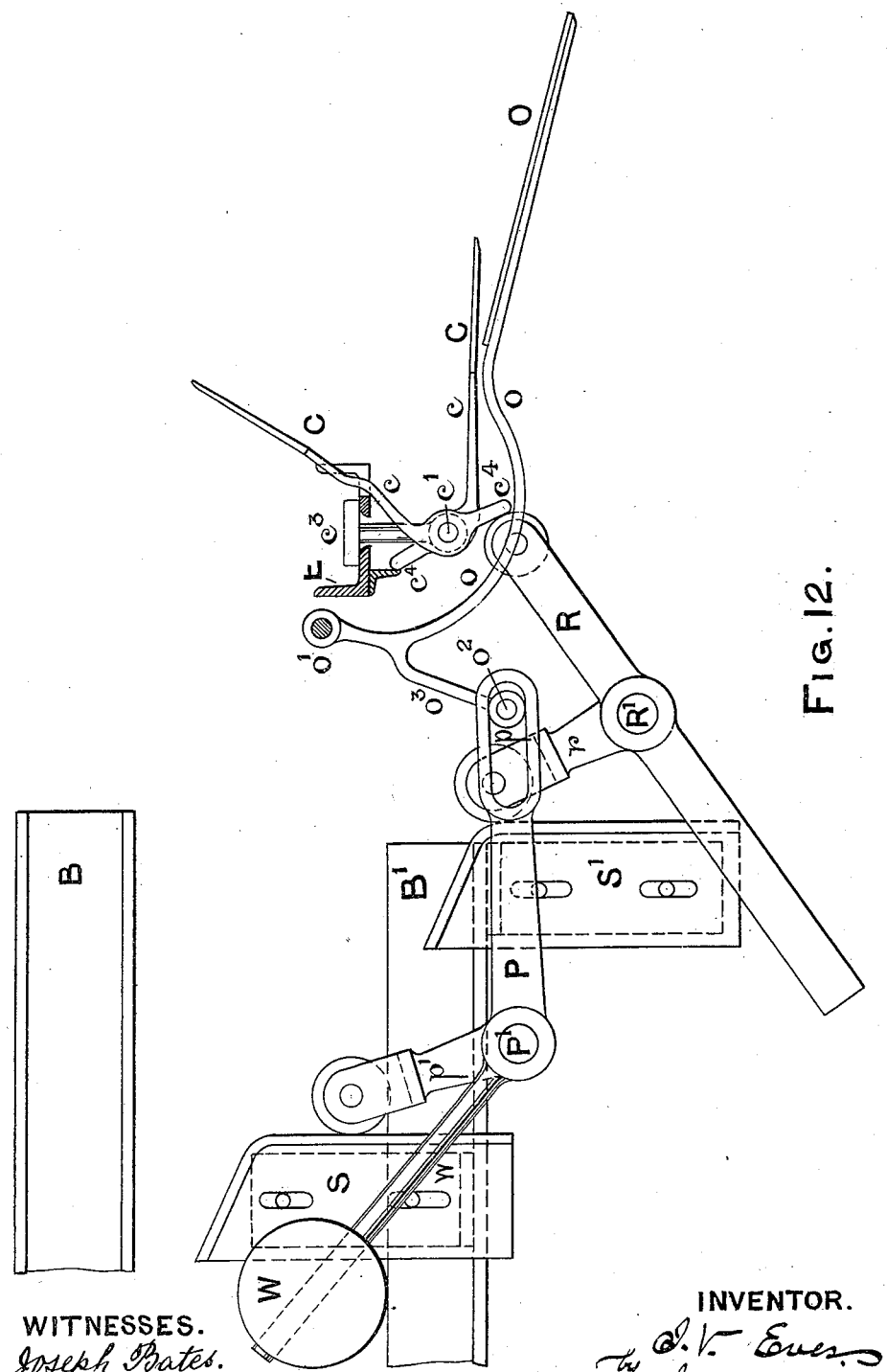
Figure 13:
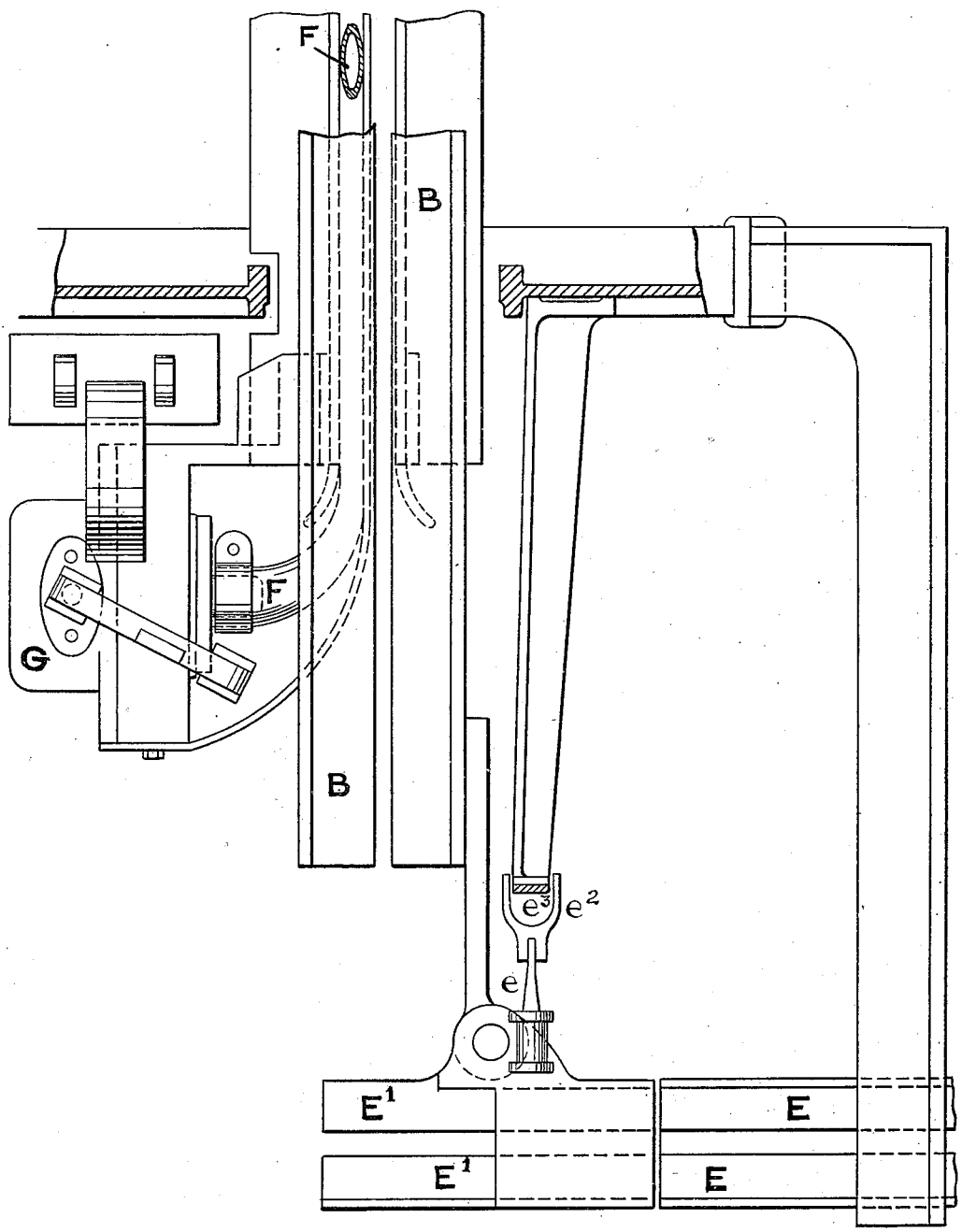
Figure 23:
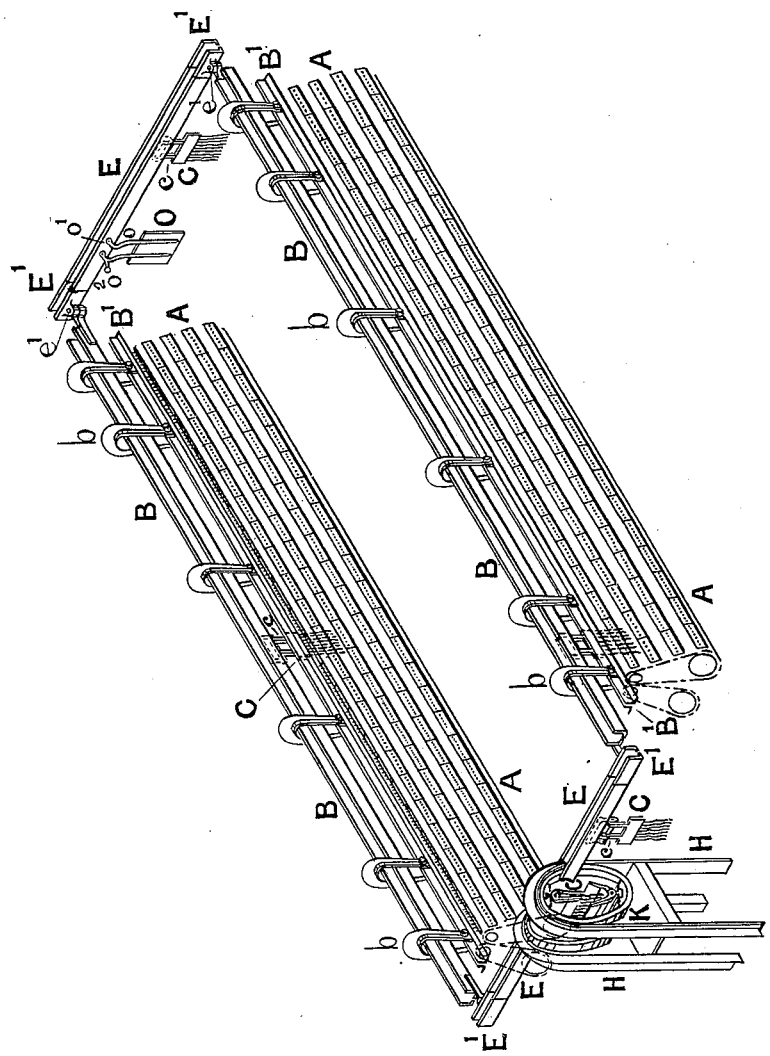

Figure 1 is a front elevation of one machine or head. Fig. 2 is an end elevation of one head, upper half. Fig. 3 is an end elevation of one head, lower half. Fig. 4 is an end elevation of the adjoining head, upper half. Fig. 5 is an end elevation of the adjoining head, lower half. Fig. 6 is a front elevation of intermediate of upright framing H and crossover channels E. Fig. 7 is a plan of the driving mechanism shown in Figs. 2 and 4. Fig. 8 is a side elevation of mechanism for reversing the holders and fiber. Fig. 9 is a transverse section of Fig. 8. Fig. 10 is an end elevation, enlarged, of opposite head shown in Fig. 4, also showing mechanism for opening holders to release the finished fiber and replace it with a fresh piece or bunch. Fig. 11 is a side elevation of holder opening and releasing mechanism shown in Fig. 10. Fig. 12 is a side elevation of mechanism shown in Fig. 10, another position. —Fig. 13 is a plan, enlarged, showing ends of longitudinal channel with mechanism for transferring holders to or from the same. Fig. 14 is a transverse section, enlarged, through the blades of holder and lower channel and pneumatic tube. Fig. 15 is a side elevation, enlarged, of part of Fig. 14. Fig. 16 is a plan of Fig. 15. Fig. 17 is a front elevation of one pneumatic or hydraulic press and valve for operating same. Fig. 18 is a front elevation of same at end of adjoining machine. Fig. 19 is a side elevation of press, partly in section. Fig. 20 is a plan of same, Fig. 17. Fig. 21 is a plan of Fig. 18. Fig. 22 is a diagrammatic plan showing four presses outside the four corners of two machines. Fig. 23 is a diagrammatic perspective view showing the course of the fiber through the machine.

The hackle-sheets A and the parts of the machine which carry and operate them are of usual construction and are consequently not shown in the drawings or described in the specification.

It is necessary that the channels B, which carry the flax-holders C in the two heads of the machines, should work or rise and fall perfectly in unison in order that the holders may be regularly transferred from one to the other. To effect this, I connect the two driving-shafts D D', Fig. 7, by a cross-shaft $D^2$ and bevel-wheels $d\ d'$, so that both shafts D D' are driven from the same source of motion. The shaft $D^2$ is driven by wheel and pinion $d^2$ from the belt-pulley shaft $D^3$, the arrangement being such that the driving-belt is driven at a much higher superficial speed than at present when it drives direct onto the main shaft of the machines. The belt runs onto the fast and loose pulleys $d^3$, and the flywheel effect of the fast-running pulleys and belt steadies the whole motion of the machine when the reciprocating parts are in action.

Between the first and second heads or machines I place a transverse or crossover channel E, by which the flax-holders are carried from one to the next. The greater part of the crossover channel E is made stationary, with the swiveling ends E' rising and falling with the channels B to transfer the holders C from one to the other.

The transverse channel E is divided at one end of the machine at or near the center to allow of the changing or removal and replacement of the flax-holders at one end for the purpose of reversing the flax in the holder, and at the other end of the machine it is partially cut away for the purpose of removing the hackled piece or bunch of flax and replacing it by another. In the simpler form of the machine these operations may both be performed by hand labor; but I also include in my invention mechanism at one end of the machines inserted at the opening in the transverse channel E to reverse the flax and at the other end of the machines mechanism to release or open the holder to permit of the removal of the finished piece or bunch of flax and the replacement of it by a fresh piece or bunch of unhackled flax.

The transverse channels E are set or fixed at the same level or height as the longitudinal channels B when the latter are at the bottom of their traverse or lowest position.

Between the ends of the channels B and the transverse channels E are fitted swiveling end pieces E', which rise and fall with the channel B, which when the channels B are at the top of their traverse are in line therewith and when the channels B are at the bottom of their traverse are level with and in line with the transverse channel E. The swiveling end pieces E' are mounted upon radial arms $e$, mounted upon swiveling pins or pivots $e'$, and are caused to rotate a quarter-revolution as the head ascends and descends by the projection $e^2$ engaging a volute or twisted or screwed bar $e^3$.

The holders C are pushed into (or out of) the swiveling ends E' in the ordinary way by the catch-bar $B^2$ at present employed with the main channels B. A similar catch-bar arrangement $E^2$ carries the holders out of one radial or swiveling end E' and thence across the crossover channel E into the opposite swiveling end, where it is taken hold of by the catch-bar of the main channel and carried forward in the usual way.

Each machine-head is made with two channels—an upper one, B, from which the holders C are suspended, and a lower one, B', where pressure is intermittently applied to the holders—and the holders C are made with arms $c$ to extend from the upper to the lower channels.

The two channels B and B' are attached to and suspended by bows $b$, similar in shape to "punching-bears," sufficiently strong to bear the weight of the channels and holders and the lateral pressure applied thereto. The channels are suspended by the chains $b'$ and counterbalanced by the weights $b^2$.

The holders C are made with projecting arms $c$, and the two parts are hinged or pivoted together on a shaft or spindle $c'$, to which a spring $c^2$ is applied to maintain the two faces closed together. The spring $c^2$ exerts sufficient pressure to hold the piece of flax in its place when no pulling action is applied to it. A T-head piece $c^3$ is attached at each end of the spindle $c'$, by which the holder is suspended from the main upper channel B and the transverse or crossover channels E. Two lateral projections $c^4$ are attached to the arms $c$ to open and close them as the holders pass through the changing and reversing mechanism at one end and through the releasing and opening mechanism at the other. The flax in the holder is held sufficiently tight by the springs till the holder passes into the channels, where the ultimate pressure is applied to resist the tearing-out action of the hackling-sheets A.

Sufficient pressure must be applied to the holders C at the time the flax fiber enters between the hackle-pins on the sheets A to prevent the fibers being dragged out, and this when not applied individually to each holder must be released, when the flax again emerges from between the hackle-pins to permit of the lateral movement of the holders along the channels B B'.

In the channel B', behind the blades of the holders C, is fitted a pneumatic or hydraulic tube F, which runs the whole length of the machine. This tube F is in communication through a valve G with an air pump or accumulator or other source of air or hydraulic pressure. (Not shown in the drawings.) The valve G is of ordinary type, with an air-inlet $g$ and exhaust $g'$, and is attached to rise and fall with the channels B B'. The valve operates to shut off the air-supply and open the exhaust connected with the tube F as soon as the channels B B' reach the top of the lift, and in the reverse direction to open the air-inlet and close the exhaust, and thus apply pressure to the pneumatic tube F, as soon as the channels commence to descend. The pneumatic tube is placed between the side of the channel B' and a movable plate or belt $f$ and is incased in a tube $f'$, of canvas or leather or other protecting material. The tube F may be hydraulic instead of pneumatic.

The valve G is operated by the lever $g^3$, which at the top of the upward traverse of the channels B B' engages with a fixed part of the frame and is moved in one direction to close the valve and open the exhaust, and when the channels commence their downward traverse the under side of the lever engages another fixed projection, throwing it over in the reverse direction to open the valve G.

The pneumatic or hydraulic pressure may be supplied from a general reservoir or accumulator or from a separate supply actuated by the mechanism of each hackling-machine.

At the changing end of the machines I apply the changing mechanism (shown in Figs. 8 and 9) placed between the upright framing H, (shown in Figs. 1 to 7,) which also supports the ends of the transverse channel E. In the framing H is inserted a toothed ring or annular carrier K, which is alternately rotated half a revolution in one direction and then in the reverse direction. The carrier K is rotated by a reciprocating rack L, which is actuated by a crank-pin $l$, working in a transverse slot $l'$, so formed with a radial portion in the center as to allow for cessation of the movement of revolution at the top and bottom of each stroke. The crank $l^3$, which carries the crank-pin $l$, is driven by spur-wheels $l^2$. At the top and bottom of the annular carrier K, I place a bracket M, with grooves $m$, into which the T-shaped suspending-head $c^3$ of the holder C slides. The T-head fits sufficiently tightly into the grooves $m$ as to be firmly held and carried around with the carrier K as it is rotated. In the bracket M are two projecting plungers $m'$, which pass through it to the inside. The inner ends bear against the projecting ends $c^4$ of the holder-arms and the outer ends carry runners $m^2$, which project beyond the periphery of the annular carrier K. Below the carrier K are placed two fixed cam-surfaces $k$ $k'$, with which the runners $m^2$ engage at each half-revolution of the annular carrier K and by which the rods or plungers $m'$ are forced through to the other side against the pressure of a spring. The rods $m'$ engage with the projecting ends $c^4$ of the holder-arms and force them outward, causing the holder C to open. An empty holder is waiting in the lower position, (see Figs. 5 and 6,) and when a full holder is carried into the bracket M at top of the carrier K the depending ends of the flax in the top holder enter between the jaws of the bottom holder. As the carrier K rotates the plungers or rods $m'$ are released from the fixed cams $k$ $k'$ and the holder-blades are allowed to close upon the finished ends of the flax. The other holder when it reaches the bottom position is opened by the rods or plungers $m'$, engaging the cams $k$ $k'$ and releasing the flax it previously held and remaining empty in readiness to receive another piece or bunch. The recharged holder with the changed flax is then moved on along the transverse channel E and another holder takes its place, and the flax therein is reversed in a similar manner.

At the sides of the rotary annular carriers K are placed two air-discharging nozzles N, through which a current of air is caused to impinge upon the edge of the flax immediately before the holder closes to insure that all ends or fibres of the flax will be within the edges of the holder when it closes upon it.

At the transverse channel E, between the feed and discharge ends of the machines, I employ mechanism which turns the holder upon its side, lays it on a table, and lifts up the cover-plate of the holder to allow the attendant to take out the hackled flax and to spread the rough flax in the emptied holder to undergo the process. (See Figs. 10 and 11.) Below the channel E, I pivot a table O, carried by two arms or levers $o$, pivoted at $o'$ and actuated by a bell-crank lever P, with a slot $p$ in one end which engages the pin $o^2$ in an arm $o^3$, projecting behind the levers $o$. The lever P is attached to the shaft P' and is operated by the short arm $p'$, with which the vertically-moving piece or slide S engages. The lever P lifts the table O into a horizontal position, and the table lifts or raises the holder C also to the horizontal. When in the horizontal position the levers R engage with the projections $c^4$ of the holder-arms $c$ of one side of the holder and raise it to the position shown in dotted lines, Fig. 8, so that the finished flax may be removed by the operative and replaced by a fresh piece or bunch of unhackled flax. The levers R are attached to the shaft R' and are operated by the short lever $r$, which is raised by the vertically-sliding piece S'.

The lever P and table O are counterbalanced and brought back to normal position by the weight W on the arm $w$ or positively by a groove in slide S.

In one arrangement I provide presses U (see Figs. 17, 18, and 19) at each corner of the pair of machines, through the jaws of which the holders C pass as they enter and leave the channels. Between the jaws of the presses U the holder C is subjected to a powerful squeeze, and when thus compressed by the plunger U' a spring-catch circular wedge (or its equivalent) attached to one plate of the holder is moved into engagement with a corresponding catch $u^3$, fixed to the other plate of the holder.

The holder C is provided with a latch on one cover plate or blade, which may be made in the form of a spring. It engages with catches projecting from the opposite cover-plate. The pneumatic or hydraulic presses shown at U force the two plates with the flax between them tightly together. A revolving motion is given to the head $u$ of the ram U' by the cams or levers $u'$, fastened to the channels B, coming in contact with the lever $u^2$, attached to the head of the ram. The latter is grooved so that the latch fits into it. Thus it is carried at one time into the catches or at another time out of them, according as the holder-plates have to be freed from pressure or squeezed together. The presses U are operated simultaneously by a single pipe U² by the valve G.

The advance or withdrawal of the rams is made simultaneously on all four corners of the pair of machines.

The pneumatic or hydraulic pistons, expanding tubes, or similar device can be used to put on or to relieve the pressure in the tongs described in the specification of McKibbin's English patent, No. 3,202, of February 8, 1898, which he employs for putting pressure on the holders attached to an endless belt.

What I claim as my invention, and desire to protect by Letters Patent, is—

1. Apparatus for hackling flax or long-staple fiber comprising in its construction hackle-sheets for treating the fiber, the holders for holding the fibers while being treated, the longitudinal channels along which the holders traverse through the machine, the transverse channels to carry the holder from one machine to the other and swiveling ends applied to the ends of each channel to carry the holders from one channel to the next substantially as described.

2. In a machine for hackling flax or long-staple fiber the combination with the hackling-sheets A and mechanism for operating them of longitudinal channels along which the holders travel through the machine transverse channels, swiveling ends a revolving annular carrier to receive and invert the holder, a rack and pinion to drive the annular carrier and a stationary cam below the revolving carrier to act upon and open the holder to release the fiber substantially as described.

3. In hackling-machines the combination with two hackling-machines of transverse channels E placed at the end of mechanism at one end for reversing the fiber and mechanism at the other end for releasing the fiber from the holder substantially as described.

4. In machines for hackling flax and long-staple fibers the combination with the hackling-sheets A the holder-channels B the transverse channels E of a flexible tube filled with fluid-pressure to apply the necessary force to the holders to resist the drag of the hackle-pins during the process of hackling substantially as described.

5. In a hackling-machine for hackling flax or long-staple fiber the combination with the holder-channel of a pneumatic or hydraulic tube for applying pressure to the holders and a valve for connecting such tube with a source of pressure whereby the pressure can be applied and relieved as required substantially as described.

6. In a machine for hackling flax or long-staple fiber the combination with the hackle-sheets A, the holders C, the holder-channel B of mechanism operated by fluid-pressure to apply force to the holders substantially as and for the purpose described.

7. In machines for hackling flax and long-staple fibers the combination with the hackle-sheets A of mechanism for operating same, holders C, two longitudinal channels B adapted to carry the holders and means for applying pressure to the holders, substantially as described.

8. In machines for hackling flax and long-staple fibers the combination with the hackle-sheets A mechanism for operating same, holder C, longitudinal channels B for the holders and transverse channels E of the table O which is lifted from vertical to horizontal position the lever P by which it is operated and the lever R and slide S' by which the holder C is opened to release the fiber substantially as described.

9. In a machine for hackling flax or long-stapled fiber mechanism for opening the holders so that the fiber may be removed and replaced constructed with a table which is lifted from vertical to horizontal position and levers to act upon the arms of the holders to open them substantially as described.

In witness whereof I have hereunto signed my name in the presence of two subscribing witnesses.

JOSHUA VALENTINE EVES.

Witnesses:
 EDWARD BENNETT,
 JAMES GILLESPIE.